United States Patent [19]
Friedrich

[11] 3,947,044
[45] Mar. 30, 1976

[54] SECONDARY SEALING DEVICE
[75] Inventor: Jaromir Friedrich, Edmonton, Canada
[73] Assignee: Bralorne Resources Limited, Calgary, Canada
[22] Filed: July 7, 1975
[21] Appl. No.: 593,817

[52] U.S. Cl. ................. 277/3; 277/103; 277/142
[51] Int. Cl.² ................. F16J 15/06; F16J 15/24
[58] Field of Search .......... 277/3, 103, 113, 27, 32, 277/142, 144, 145

[56] References Cited
UNITED STATES PATENTS

| | | | |
|---|---|---|---|
| 1,089,789 | 10/1914 | Ramberg | 277/142 |
| 3,012,611 | 12/1961 | Haines | 277/113 |
| 3,228,703 | 1/1966 | Wilson | 277/103 |
| 3,529,835 | 9/1970 | Lewis | 277/3 |
| 3,582,088 | 6/1971 | Matsuzaki | 277/3 |
| 3,888,495 | 6/1975 | Mayer | 277/3 |

*Primary Examiner*—Robert I. Smith

[57] ABSTRACT

A secondary sealing device is provided for a pump used for pumping gases under pressure. Leakage of gas between a main seal and the pump shaft is permitted up to a predetermined maximum pressure but once that pressure has been exceeded, a pressure sensor activates a switch to stop rotation of the pump shaft. When the shaft has come to a halt, a high pressure gas such as nitrogen is introduced into a secondary seal circumferential of the shaft whereby a resilient sealing ring is forced into tight sealing contact with the pump shaft to prevent any further leakage of the pumped gas to the atmosphere.

5 Claims, 2 Drawing Figures

SECONDARY SEALING DEVICE

BACKGROUND OF THE INVENTION

The present application is directed at pumps in general and more specifically at secondary sealing devices for pumps pumping gases under pressure.

Pumps used in the pumping of L.P.G. (Liquid Petroleum Gases) must meet a safety standard. At present, the failure of a main seal will allow L.P.G. to pass to the outside of the seal flange, vapourize and escape into the atmosphere. As the liquid gas changes state it can reduce the temperature of the leakage point to approximately minus 44°F. This causes a build up of ice at that point due to the condensation of the water vapour in the air and this further hampers efforts to stop the leak and make repairs.

During normal operation of the pump, the seal permits a graduated leakage of gas between the seal and the pump shaft and may be tolerated up to a predetermined pressure of, say, 5 psi. Beyond that pressure, a pressure sensing switch starts shut-down of the pump, ultimately resulting in cessation of rotation of the pump shaft. However, the gas continues to leak past the seals and at an increased pressure, thereby presenting the difficult situation described above.

SUMMARY OF THE PRESENT INVENTION

The present invention finds its utility in a pump having a pump shaft, a main seal and a leakage ring surrounding the shaft and permitting normal gas leakage within a predetermined pressure range. The secondary sealing device of the present invention comprises annular deformable seal means radially spaced from the shaft, annular piston means axially slidable in any annular cylinder surrounding the shaft and peripherally abutting the seal means, and a source of highly pressurized gas communicating with the cylinder. When a pressure exceeding the design maximum is sensed, rotation of the pump shaft is stopped and immediately the shaft has stopped rotating the gas is introduced into the cylinder to force the piston towards the seal means whereby the seal means is forced radially inwardly into sealing engagement with the pump shaft. When the L.P.G. has been removed from the pump the gas is evacuated from the pressure chamber so that the seal may assume its original configuration and the necessary repair work effected.

The secondary sealing device of the present invention thus provides a very fast and effective way of preventing excessive leakage of L.P.G. from a damaged pump and it may also be re-used should the occasion arise. The clearance provided between the unactivated seal ring and the pump shaft not only permits normal leakage but it ensures that the seal is not subject to premature wear and hence premature failure.

BRIEF DESCRIPTION OF THE DRAWINGS

The secondary sealing device of the present invention will now be described in greater detail and with reference to the drawings wherein.

DESCRIPTION OF THE PREFERRED EMBODIMENT

Figure 1:
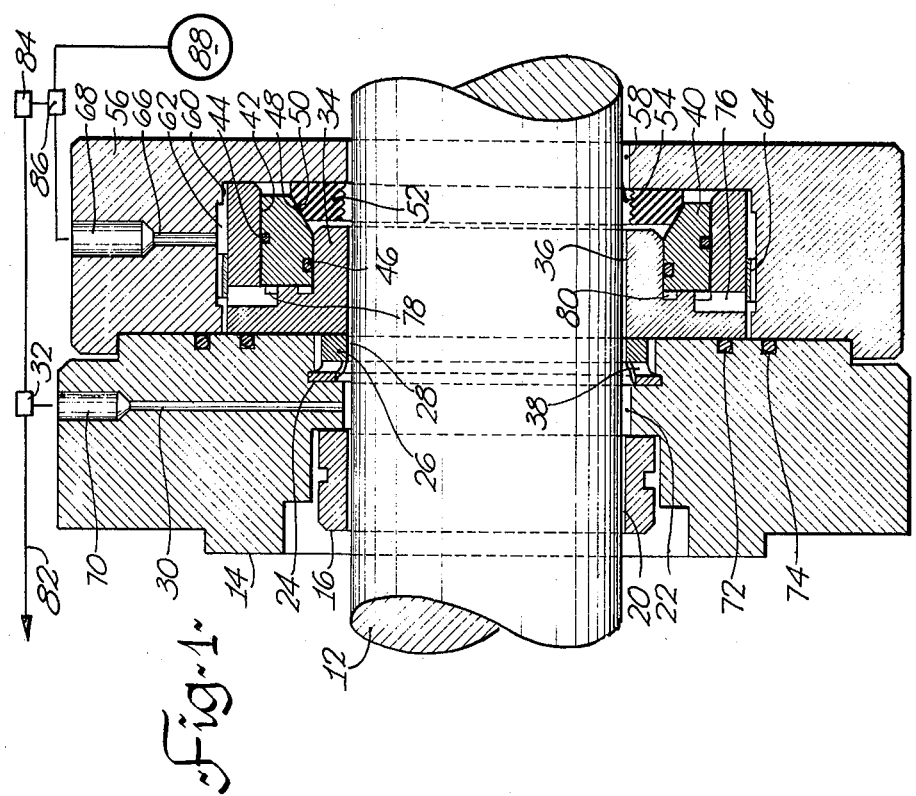
FIG. 1 is a partial longitudinal section through the pump casing and showing the secondary sealing device is its nonenergized state.

The secondary sealing device of the present application is utilized in conjection with a gas pump (not shown) for pumping L.P.G. (Liquid Petroleum Gases), such as propane, iso-butane or N-butane. The pump has a shaft 12 passing through a seal or gland plate 14 provided with a main seal 16, a leakage detection system and the secondary sealing device.

A clearance 20 is provided between the main seal 16 and the shaft 12 so that a controlled quantity of gas may leak therethrough. The leaking gas enters annular chamber 22 provided in the gland plate axially outwardly from main seal 16. A second annular chamber 24 is provided in the gland plate axially outwardly of chamber 22 in which carbon leakage ring 26 resides. The carbon ring is dimensioned so as to provide an annular clearance 28 between itself and shaft 12, the clearance 28 being such as to permit leakage only up to a predetermined maximum pressure.

An annular retaining collar 34 is generally U-shaped in cross-section, the base thereof being machined to sealingly abut the outward face of gland plate 14 and the legs being concentric with shaft 12. As with the gland plate 14 and the main seal 16, a clearance 36 is provided between shaft 12 and the innermost leg of collar 34 to permit the normal escape of gases.

When the collar 34 is in position against gland plate 14 the carbon ring 26 is forced against the machined base of the collar by a wavy spring 38 located in annular chamber or groove 24. Thus the carbon ring will be held against axial movement.

An annular piston 40 is sized to slide in the annular groove 42 provided between the two legs of collar 34. The piston is provided with O-rings 44 and 46 which seal the piston against the legs of the collar. The edge of the piston which faces outwardly towards the shaft is bevelled as illustrated in FIG. 1 by reference number 48. The bevel 48 extends around the periphery of piston 40 and abuts with the bevelled edge 50 of the annular seal ring 52. Seal ring 52 is preferably formed of a resilient material such as Teflon which is not degradable by and is impervious to the gases normally used in the pump and which has excellent wear characteristics. A certain degree of rigidity in seal ring 52 is also required so that, when in the non-energized state of FIG. 1, no contact is made with shaft 12. In fact, a clearance 54 between the seal ring 52 and shaft 12 is necessary for the normal gas escape.

Seal body 56 is the outermost portion of the secondary seal of the present invention. It also is annular in configuration with a clearance 58 surrounding shaft 12. As can be seen best in FIG. 1 seal body 56 acts as a cover for the entire seal assembly as it extends axially towards gland plate 14 to abut therewith. For assembly of the seal it is understood that seal body 56 could be fastened to gland plate 14 by a number of cap screws (not shown) distributed in a circle inwardly of the outer periphery of the seal body.

Figure 2:
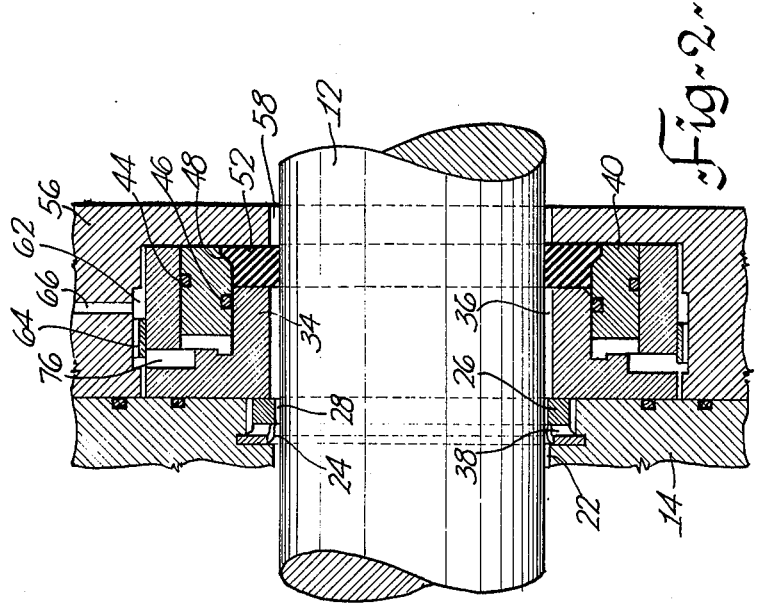
FIG. 2 is similar to FIG. 1 and shows the secondary sealing device in its energized state.

As is seen in FIGS. 1 and 2 the seal body 56 is provided with an annular cavity or recess 60 which is greater in radial extent than the radial thickness of retaining collar 34 thereby permitting a degree of radial play of collar 34 therewithin. Cavity 60 is also provided with a circumferential groove 62 over a portion of its axial length in which groove resides a wavy annular locator ring 64, the purpose of which will become evident during the discussion of the operation of the secondary seal.

Extending radially from groove 62 is a bore 66 which opens into an enlarged bore 68 which in turn is adapted to receive a pressure line fitting for the fluid system to be described hereinafter. A similar bore 32 extends radially from annular chamber 22 in gland plate 14 to meet with enlarged bore 70, adapted to also receive a pressure line fitting.

It is appropriate to mention at this time that O-ring seals 72 and 74 are provided between gland plate 14 and seal body 56 and retaining collar 34 respectively. They ensure that there will be no escape of gas between the abutting surfaces of these elements.

Within retaining collar 34 there is at least one radially directed pressure access bore 76 communicating between circumferential grooves 78 and 80 which open into the central annular groove 42 of the collar and the circumferential groove 62 in cavity 60. The purpose of the bore 76 and grooves 78 and 80 will become evident during the discussion of the operation of the invention.

The fluid circuit associated with the present invention includes a pressure sensor-switch 32 which is in fluid communication with bore 70 in gland plate 14. Switch 32 is connected via line 82 to the drive unit for the pump (not shown), in particular to the stop circuitry of the motor driving the shaft. Switch 32 also is connected to a timer 84 which operates a three-way valve 86. A source 88 of compressed, high pressure gas such as nitrogen is fluidly connected to valve 86 which in turn is fluidly connected to bore 68 in seal body 56.

The operation of the secondary seal of the present invention is as follows.

During normal operating conditions the acceptable leakage gas escaping past the main seal 16 is allowed to pass into cavity 22 and along the shaft 12 into cavity 24, past carbon ring 26, retaining collar 34, seal ring 52 and seal body 56 to atmosphere. During such leakage the pressure in cavity 22 is monitored by pressure sensor-switch 32.

When the pressure builds up in cavity 22 as a result of main seal failure pressure sensor-switch 32 senses the condition and signals a shut-down of the pump motor. It also starts timer 84 which is calibrated to send a signal to valve 86 when the pump shaft 12 has stopped rotating. At this point in time valve 86 opens to permit the high pressure gas from source 88 to flow therethrough into bores 68 and 66. This gas enters circumferential groove 64, radial bore 76 and grooves 78 and 80 to exert a substantial outward force on piston 40. As the piston 40 moves outward (to the right in FIG. 1), sealed by O-rings 44 and 46, its bevelled leading edge 48 exerts a radially inwardly directed force on seal ring 50 through its bevelled edge 50. The force exerted through piston 40 is sufficient to squeeze the seal ring radially inwards so that it is forced into sealing engagement with the shaft 12, as shown in FIG. 2, to prevent escape of the gas in the pump. In a major leakage situation the leakage pressure may go as high as 1050 psi and hence the secondary seal and associated components should be designed to withstand at least 1500 psi. Tests conducted on a secondary seal constructed in accordance with the present invention showed maintenance of the seal at pressures up to 2600 psi.

The secondary seal is maintained until the pump can be emptied and repairs made to the main seal. When gas pressure in grooves 78 and 80 is released the seal ring 52 starts to return to its original unloaded condition. As it moves back radially it pushes the piston 40 axially back in groove 42 to its original position as shown in FIG. 1. The secondary seal is then ready for the next failure cycle.

One advantageous aspect of the present invention is that it takes into account slight eccentricities of the shaft 12 relative to the centerline of the gland plate 14 and seal body 56. As previously mentioned the seal ring 52 and the retaining collar 34 "float" in their respective cavities. During the squeezing action on the seal ring, the seal ring will conform to the circumference of the shaft 12 and this conforming action may exert an opposing outward force on the piston 40 and hence on the retaining collar 34. This outward force results in the collar ring taking up a new, working position concentric to shaft 12 and seal ring 56 due to the resilient nature of locater ring 64 which is resiliently displaced by collar 34. Under non-emerging conditions the locater ring will maintain collar 34 concentric to seal body 56 rather than concentric to shaft 12.

It is thus seen that the secondary seal of the present invention will provide an extremely rapid and effective seal against high pressure gases while permitting normal operation and greatly reducing the effects due to wear.

I claim:

1. In a pump for pumping pressurized gas and having a pump shaft, a main seal, a leakage ring surrounding said shaft permitting gas leakage within a predetermined pressure range and pressure sensing means, the improvement comprising annular deformable seal means radially spaced from said shaft, annular piston means axially slidable in an annular cylinder surrounding said shaft and peripherally abutting said seal means, and a source of highly pressurized fluid communicating with said cylinder, said sensing means including switch means whereby a pressure detected by said sensing means exceeding the maximum pressure of said range actuates said switch means to stop rotation of said shaft and to thereafter permit said fluid to enter said cylinder whereby said piston forces said seal means radially inwardly to sealingly engage said shaft and prevent further leakage therearound.

2. The invention of claim 1 wherein said cylinder is contained within an annular retaining collar, said collar also including bore means for communicating said fluid to said cylinder.

3. The invention of claim 2 wherein said collar floats within a chamber formed in an annular seal body, said chamber also housing annular wavy spring means positioned between an inner circumferential surface of said chamber and an outer circumferential surface of said collar.

4. The invention of claim 1 wherein said piston is provided with a peripheral bevelled edge abutting a corresponding peripheral bevelled edge on said seal means whereby axial forces developed on said piston are transformed into generally radial forces in said seal means.

5. In a pump for pumping pressurized gas and having a pump shaft, a main seal, a leakage ring surrounding said shaft permitting gas leakage within a predetermined range of pressures and pressure sensing means, the improvement comprising an annular seal body having an annular chamber therein and first bore means communicating with said chamber, an annular retaining collar resiliently located within said chamber and containing an annular axially directed cylinder and second bore means communicating between said chamber and said cylinder annular piston means axially slidable in said cylinder and having a peripheral bevelled edge outward of said cylinder, annular seal means in said chamber having a peripheral bevelled edge abutting the peripheral bevelled edge of said piston, and a source of highly pressurized fluid in valved communication with said first bore means, said sensing means including switch means whereby a pressure detected by said sensing means exceeding the maximum pressure of said range actuates said switch means to stop rotation of said shaft and to thereafter permit said fluid to pass through said first and second bore means into said cylinder whereby said cylinder is forced against said seal means to force it radially inwardly into sealing engagement with said shaft, thereby preventing further leakage of said gas.

* * * * *